Aug. 27, 1935.  C. T. BARD  2,012,863
BALL CLOSING FITTING
Filed Dec. 4, 1934
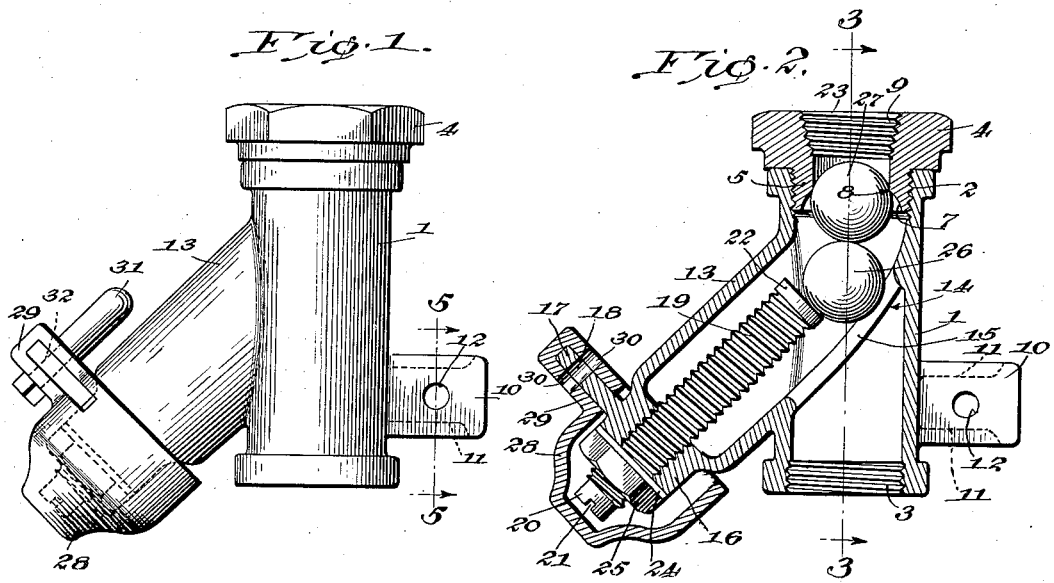
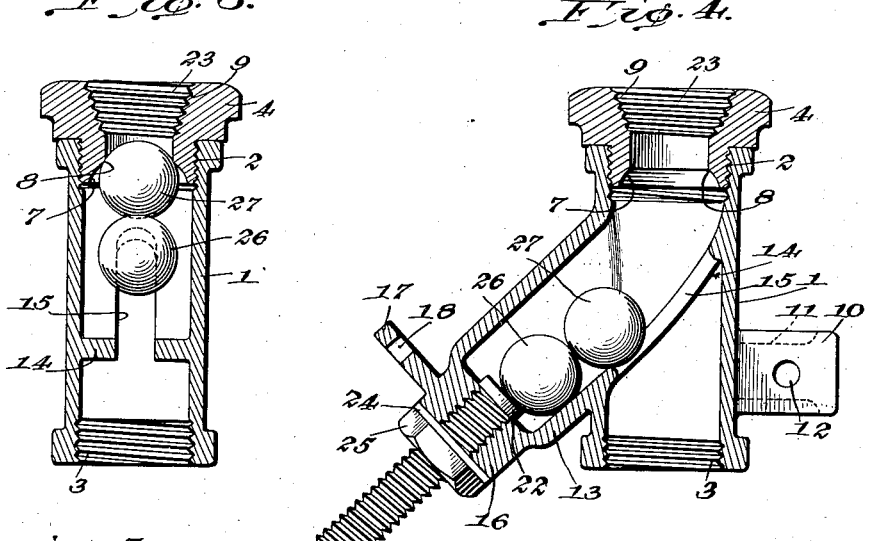
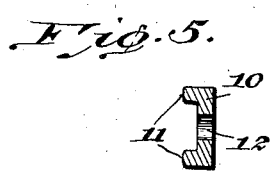
Inventor
Charles T. Bard,
By Munn, Anderson & Liddy
Attorneys Patented Aug. 27, 1935

2,012,863

UNITED STATES PATENT OFFICE 2,012,863

BALL CLOSING FITTING

Charles Tyler Bard, Gales Ferry, Conn.

Application December 4, 1934, Serial No. 755,958

7 Claims. (Cl. 251—139)

My invention relates to improvements in ball closing fittings which may be used for closing pipe lines, such as those used in carrying gas, oil, water, steam or air, to seal the flow, and it consists in the combinations, constructions and arrangements herein described and claimed.

Certain types of shut-off valves in common use for the purpose of sealing a flow of gases or liquids have disadvantages in that some force the valve straight down on its seat, and, if there is deposit thereon, this deposit will prevent the close contact of the valve with the seat, and result in the leaking of the fluid past the valve.

Other types having a core inserted from the outside which is turned right and left to open or close the flow of gas and liquids and from constant turning in use this core becomes scored allowing seepage of gas and liquids around the core.

Usually shut-off valves are easily identified and are generally made so that by removing portions of the valve casing and the valve, gas or other fluid may be stolen. Thus a shut-off valve for a gas meter may form a convenient means whereby the gas may be used by one who wishes to defraud the gas company.

An object of my invention is to provide a fitting, containing closing mechanism, which has the appearance of a closed Y connection, as distinguished from a shut-off valve which can be readily identified.

A further object of the invention is to provide a fitting containing a closure means which is so constructed that the valve seat is scoured in the act of shutting off or sealing the flow of fluid, thereby maintaining the seat and the valve member in clean condition and permitting perfect seating.

A further object is to conceal means for effecting the closure of pipes against flow in which the valve is held down on its seat by the powerful pressure of a screw.

A further object of the invention is to provide a device of the type described which consists of relatively few parts so that there is little liability of the device getting out of order.

Other objects and advantages will appear in the following specification and the novel features of the invention will be particularly pointed out in the appended claims.

My invention is illustrated in the accompanying drawing forming a part of this application, and in which:—

Figure 1 is a face view of the fitting.

Figure 2 is a central sectional view of the fitting with the locking means removed.

Figure 3 is a section along the line 3—3 of Fig. 2.

Figure 4 is a sectional view of a portion of the device showing the screw and balls in retracted position to permit the free flow of fluid, and, Figure 5 is a section along the line 5—5 of Fig. 1.

Referring now particularly to Figs. 2 and 3 I have shown therein a fitting having a body portion 1 which is threaded internally at its ends, as shown at 2 and 3, respectively. A plug 4 has a reduced portion 5 which is threaded to engage the threads 2 of the body portion 1. These threads are of proper size to form a tight connection when screwed together. This plug has a cut-away portion 7 contiguous to a circular seat 8. The interior of the plug is hollow, as shown, and is threaded at 9 to engage the threads of a pipe connection, not shown.

The body portion 1 has a laterally extending integral lug 10 having flanges 11 and a bolt opening 12. This lug is for the purpose of connection to a meter bar when the fitting is used with a gas meter and of course, when the fitting is used in other connections, the lug may be omitted, since it has no particular bearing on the real invention of the case.

The body portion 1 has an integral angular cylindrical extension 13 which communicates with the interior of the body portion. A curved partition 14 extends across the interior of the body portion 1, as shown in the drawing, and this partition is provided with a slot 15, as plainly indicated in Fig. 3. The outer end of the cylindrical portion 13 terminates in a head 16 which has a threaded bore concentric with the axis of the cylindrical portion 13. The head 16 has a lug 17 which projects laterally on one side, as shown in the drawing, and this lug is provided with an opening 18 for a purpose hereinafter described.

A screw 19 is provided with threads to engage the threaded portion of the head 16. This screw is preferably made of steel. At one end is a portion 20 provided with a kerf 21, and at the other is a head 22 which is of greater diameter than the threaded opening through the head 16.

From the foregoing description of the various parts of the device the operation thereof may be readily understood.

Consider Fig. 4. The screw 19 is inserted through the opening 2, before the insertion of plug 4, and is tilted until the end 21 enters the opening of the bore through the head 16 when it can be screwed into the position shown in Fig. 4.

The head 22 as stated, cannot pass the head 16 and therefore the screw cannot be drawn outwardly through the end of the cylinder 13.

A washer 24 and a nut 25 may be used in maintaining the screw in its adjusted position. Prior to screwing the plug 4 in position, two accurately turned hardened steel balls 26 and 27 respectively, are dropped into the interior of the device upon the inclined partition 14 and roll down into the position shown in Fig. 4. Figure 4 shows the normal position of the device when the fluid is flowing. This flow of course will be through the slot 15 and through pipe connections, not shown, at each end of the fitting.

Now when it is desired to close the fitting the nut 25 is loosened and the screw is forced inwardly, driving the balls before it. The partition 4 is so curved as to guide the balls toward the seat 8. This seat, it will be observed, is of slightly less diameter than the ball 27. As the latter reaches its seating position, it is being turned by the rotary movement of the head 22 which causes the turning of the ball 26 and the consequent turning of the ball 27, so that as long as the screw 19 is turned this ball 27 keeps rotating, thus scouring the seat and maintaining a perfect closure.

Figure 2 shows the closed position in which the screw 19 is in as far as it will go. The lock nut 25 is then tightened and a shield or cup-shaped cover member 28 is then placed over the end of the screw. This shield has an integral laterally extending lug 29 provided with an opening arranged to receive the lug 17 and having openings 30 arranged to register with the opening 18 in the lug 17. A lock 31, which has a portion 32, arranged to pass through the registering openings, holds the shield securely in position. This lock 31 does not have the appearance of a lock. The particular form and the operation of the lock forms no part of the present invention. The lock is capable of universal use, and therefore constitutes an invention in itself. It does have a bearing on the purpose of this invention however, in that the lock has the appearance shown in the drawing, and therefore does not draw attention to the fact that it is a lock, just as the Y shaped fitting appears to be a Y connection instead of a closure means. The shield or cover 28 and its lug 29 are made of hardened steel to resist sawing.

When the fitting has been set to close the flow and the lock applied, it has the appearance shown in Fig. 1, and one not familiar with the construction and operation would readily be deceived into thinking that it was an ordinary Y connection. Even if the shield should be taken off, it is not possible to run the screw out far enough to make an attachment for surreptitiously using gas where the fitting is used in connection with a meter, because the head of the screw will not pass through the threaded portion 16.

The arrangement of the balls and screw permits of a powerful wedging action to maintain the ball 27 on the seat and to thus securely maintain the closed condition when desired.

I claim:

1. A ball closing fitting having an inlet and outlet and being provided with a circular seat, said inlet, outlet and circular seat being in axial alinement, an integral angular extension carried on one side of said body portion between the inlet and outlet, said extension having a head at the outer end provided with a threaded bore, a screw, threaded to engage the threads of the bore and having a head disposed within the extension for preventing the withdrawal of the screw from the extension, an inclined support and a pair of balls disposed within the body portion and arranged to roll on said support, one of said balls being arranged to engage the seat and the other ball being disposed between the head of the screw and the seat-engaging ball.

2. A ball closing fitting having an inlet and outlet and being provided with a seat, an integral angular extension carried on one side of said body portion between the inlet and outlet, said extension having a head at the outer end provided with a threaded bore, a screw, threaded to engage the threads of the bore and having a head disposed within the extension for preventing the withdrawal of the screw from the extension, a pair of balls disposed within the body portion, one of said balls being arranged to engage the seat and the other ball being disposed between the head of the screw and the seat-engaging ball, and a curved slotted partition in said body portion arranged to support and to guide said balls.

3. A ball closing fitting comprising a cylindrical body portion, a removable plug secured to said body portion at one end thereof, said plug being provided with an annular seat, a curved partition carried by the body portion, said partition being provided with a slot, an angular extension of said body portion on one side thereof, the outer end of the extension having a head provided with a threaded bore, a screw, threaded to engage the threads of the bore and having a head disposed within the extension for preventing the withdrawal of the screw, and a pair of balls disposed within the interior of the fitting, one of said balls being arranged to engage the seat, and the other ball being normally in contact with the head of the screw and arranged to slide on the partition and to wedge the seat-engaging ball against the seat when the screw is turned.

4. A ball closing fitting comprising a cylindrical body portion, a removable plug secured to said body portion at one end thereof, said plug being provided with an annular seat, a curved partition carried by the body portion, said partition being provided with a slot, an angular extension of said body portion on one side thereof, the outer end of the extension having a head provided with a threaded bore, a screw, threaded to engage the threads of the bore and having a head disposed within the extension for preventing the withdrawal of the screw, a pair of balls disposed within the interior of the fitting, one of said balls being arranged to engage the seat, and the other ball being normally in contact with the head of the screw and arranged to slide on the partition and to wedge the seat-engaging ball against the seat when the screw is turned, and means for locking the screw in its adjusted positions.

5. A ball closing fitting comprising a cylindrical body portion, a removable plug secured to said body portion at one end thereof, said plug being provided with an annular seat, a curved partition carried by the body portion, said partition being provided with a slot, an angular extension of said body portion on one side thereof, the outer end of the extension having a head provided with a threaded bore, a screw, threaded to engage the threads of the bore and having a head disposed within the extension for preventing the withdrawal of the screw, a pair of balls disposed within the interior of the fitting, one of said balls being arranged to engage the seat, and the other ball being normally in contact with the head of the screw and arranged to slide on the partition and to wedge the seat-engaging ball against the seat when the screw is turned, means for locking the screw in its adusted positions, a cup-like shield for enclosing the end of the extension, and means for locking the shield to the extension.

6. A ball closing fitting comprising a hollow body portion having an inlet, an outlet and a removable circular valve seat all in axial alinement, an integral angular extension carried on one side of said body portion, a guiding support disposed in said body portion, a pair of balls arranged to roll on said support, and means carried by the extension and insertable when the valve seat has been removed for engaging one ball to force the other ball into closing engagement with said seat, when the latter is in its normal position.

7. A ball closing fitting comprising a hollow body portion having an inlet, an outlet and a removable circular valve seat all in axial alinement, an integral angular extension carried on one side of said body portion, a guiding support disposed in said body portion, a pair of balls arranged to roll on said support, and a screw carried by the extension and insertable from the body portion and having a head arranged to engage one of said balls for forcing the other ball into closing engagement with the seat, when the latter is in its normal position.

CHARLES TYLER BARD.